M. SPINELLO.
SCALE.
APPLICATION FILED SEPT. 25, 1919.
1,359,470.
Patented Nov. 16, 1920.
2 SHEETS—SHEET 1.
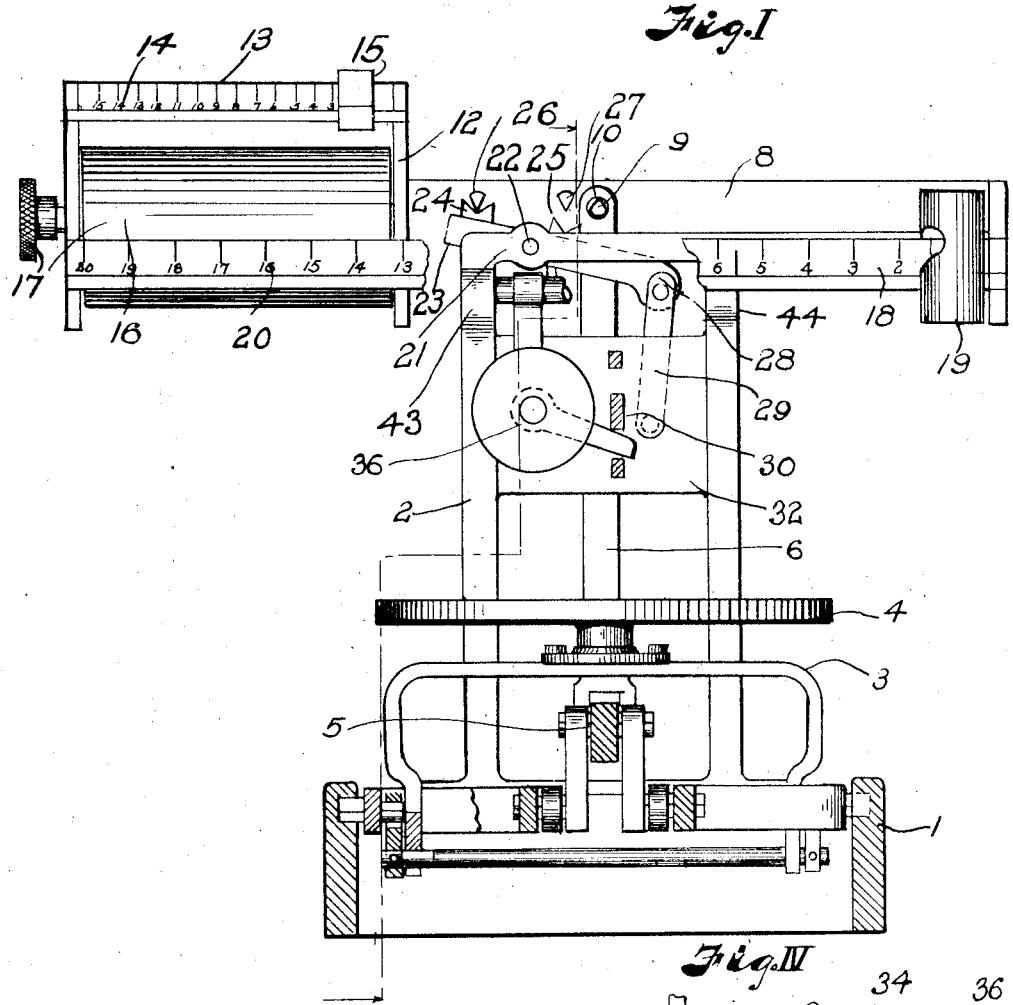
Fig. I
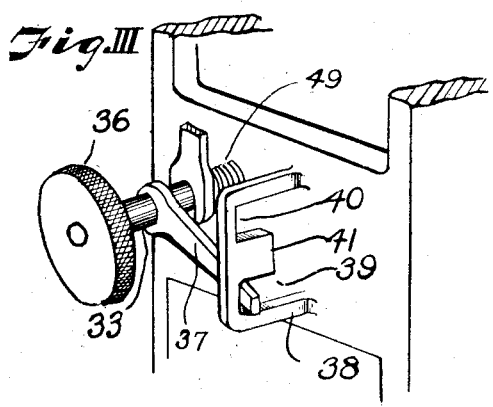
Fig. III
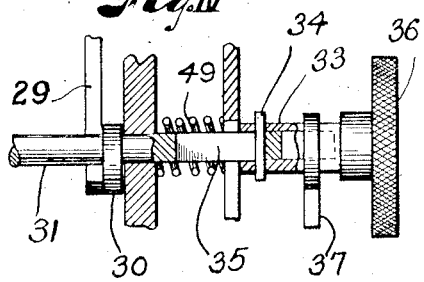
Fig. IV
INVENTOR
Mathew Spinello
BY
ATTORNEY M. SPINELLO.
SCALE.
APPLICATION FILED SEPT. 25, 1919.
1,359,470.
Patented Nov. 16, 1920.
2 SHEETS—SHEET 2.
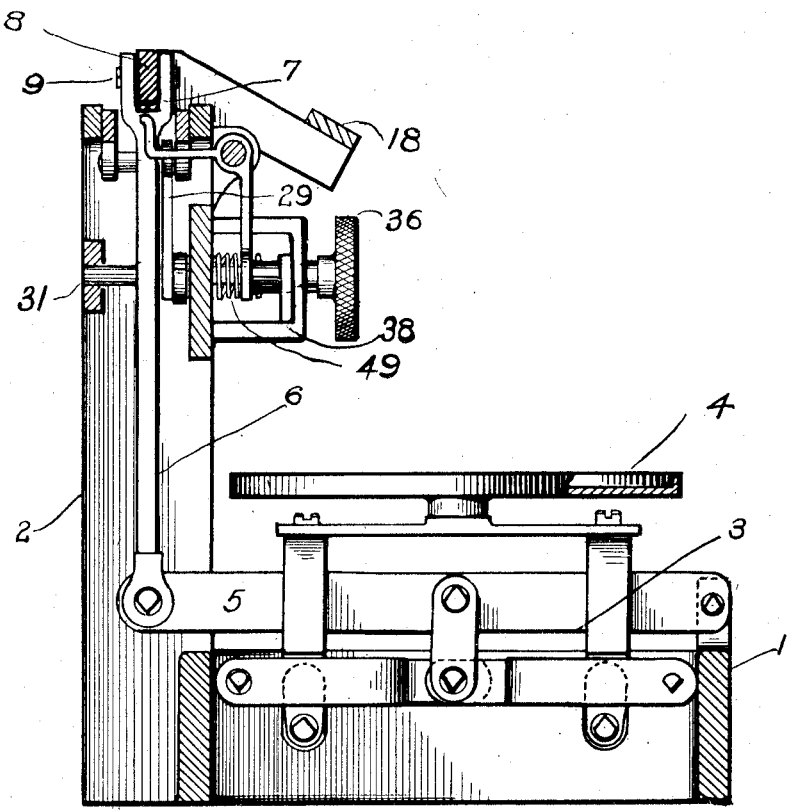
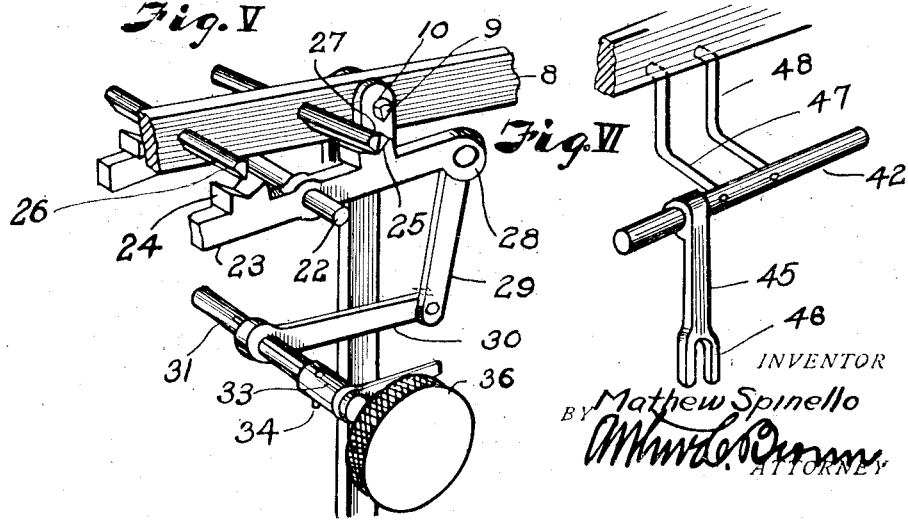
INVENTOR
Mathew Spinello
BY
ATTORNEY

UNITED STATES PATENT OFFICE.

MATHEW SPINELLO, OF KANSAS CITY, MISSOURI.

SCALE.

1,359,470.  Specification of Letters Patent.  Patented Nov. 16, 1920.

Application filed September 25, 1919. Serial No. 326,209.

*To all whom it may concern:*

Be it known that I, MATHEW SPINELLO, a citizen of the United States, residing at Kansas City, in the county of Jackson and State of Missouri, have invented certain new and useful Improvements in Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to scales and particularly to scales adapted to weigh different denominations or fractions of a given standard or weights of different standards, for example, according to my invention, the scale is adapted to weigh ounces or pounds and in order to accomplish this, I have provided means whereby the fulcrum for the scale beam may be shifted to vary the leverage of the scale beam with respect to the load or weight.

I have also provided means whereby the scale may be converted from a pound-weighing scale to an ounce-weighing scale and vice versa. The denominations used, however, are by way of illustration as it is obvious that the scale beam might be calibrated for varying the denominations under any standard or weight.

In the drawings,

Figure I is an elevational view of the mechanism comprising my invention, the scale beam or platform-supporting mechanism being shown partly in section.

Fig. II is a vertical longitudinal sectional view through a scale constructed in accordance with my invention.

Fig. III is a detail perspective view of a part of the fulcrum shifting means.

Fig. IV is a longitudinal sectional view through part of the manually operated fulcrum shifting means.

Fig V is a detail perspective view of the same, and

Fig. VI is a detail perspective view of the scale beam temporary support.

Referring now to the drawings by numerals of reference:

1 designates a scale base provided with a standard 2. The base carries a scale platform or scale beam supporting mechanism, generically designated as 3, which may be of any preferred form and upon which is mounted a platform or pan 4. To the lever 5 of the supporting mechanism 3 is connected a link 6 terminating at its upper end in a yoke 7 in which is pivoted the beam 8, the connection being provided with knife bearings 9 projecting from opposite sides of the beam 8 and through openings 10 in the yoke 7. The beam 8 carries a frame 12, on the upper bar 13 of which may be suitable calibrations 14, preferably designating ounces and on the bar 13 is a poise or weight 15 to designate the point in the scale to which the beam 8 is an equilibrium and said frame may carry a computing drum 16 of approved construction adapted to be rotated by the knurled nut 17. The beam supports a poise balance or guide 18 on which is a counter-poise 19, normally opposing the left hand end of the bar of the beam 8 when the poise 15 is being operated, but adapted to slide over to the calibrations 2ª when the articles are to be weighed in heavier denominations, such as pounds, etc.

The standard 2 is of skeleton form and pivoted in the top bar 21 is a rock shaft 22 supporting a fulcrum lever 23 having fulcrums 24 and 25 adapted to be engaged respectively by the knife bearings 26 and 27 and these fulcrums may be brought into play by shifting the lever by mechanism which I will now describe.

The lever 23 is provided at one end with a head 28 to which is connected a link 29 pivoted to a crank 30 on a shaft 31 mounted in the web or plate 32 constituting part of the standard and upon the forwardly projecting end of the shaft 31 is a reciprocatory and rotatable tubular member 33 slidable on said shaft and having a cross key 34 projecting transversely through the tubular member 33 and through a slot 35 at the end of the shaft over which the tubular member is telescoped. The tubular member is provided with a knob or knurled disk 36, by means of which the same may be shifted. Said tubular member carries a latch projection 37 fixed thereon, which is adapted to engage in a double slotted keeper 38, divided into slots 39 and 40 by the tooth 41. When the finger or projection 37 is in one of the slots, one of the fulcrums or seats 24 or 25 will engage a corresponding pivot bearing 26 or 27. When it is in the opposite slot, an opposite fulcrum will be in function.

Since it is necessary to transfer from one fulcrum to the other, it becomes desirable to support the scale beam during this time so I have provided means whereby a temporary support may be moved into position before the shifting of the fulcrum takes place. This mechanism consists of a shaft 42 journaled in bearings 43 and 44 on the standard 2 and said shaft carries a depending arm 45 having a bifurcated end 46 which straddles the shaft 31, and upwardly and inwardly projecting fingers 47 and 48 are carried by said shaft 42, which are normally held out of scale beam supporting position by the spring 49, one end of which bears against the plate 30 and the other against the bifurcated end 46 of arm 45.

When, however, the actuator consisting of the tubular member 33 and knurled nut 36 is moved forward upon the shaft 31, the bifurcated end 46 of arm 45 will be compressed against the spring to rock the shaft 31 and move the fingers 47 and 48 into position to rest immediately beneath the edge of the beam 8 so that when the fulcrum seat is moved away from its pivot bearing, the beam will be held in position until the substituted seat has moved into position to receive its pivot, then the pressure on the disk 36 will be released and the expansion of the spring will permit the fingers 47 and 48 to move out of engagement with the beam and enable the scale to function in the usual manner.

When the parts are in the position shown in Figs. I and II and it is desired to weigh in ounces, the counter-poise balance 19 will be moved on the beam somewhere in the position approximating its position in Fig. I to cause the beam to balance. At this time the fulcrum will be provided by the members 24 and 26, then the weight or poise 15 may be operated along bar 13 to weigh ounces.

When it is desired to shift to pounds, however, the operator will first press on the knurled disk 36 to actuate the bifurcated arm 45 and move the fingers 47 and 48 into beam supporting position. Then a rotative movement of the disk 36 will cause a corresponding movement of the shaft 31 and through the crank 30, link 29 and lever 23, the fulcrum will be shifted and upon releasing the disk 36, the projection or finger 37 will move back into one of the slots and maintain the fulcrum mechanism in its fixed relation until such time as is necessary to again shift it.

When the heavier weight is to be used, the poise 19 will be moved over to the calibrations 20 and coöperate with the scale thereon to indicate the weight upon the platform or beam 4.

From the foregoing, it will be apparent that the scale may be converted from a device adapted to weigh relatively small fractions to a scale adapted to weigh relatively large units by easily operated mechanism for shifting the fulcrum of the scale beam and that the scale may be reconverted back into a device for weighing relatively small fractions in a most expeditious manner, thereby enabling the device to be adapted for use over a wider range than scales now generally employed.

What I claim and desire to secure by Letters-Patent is:

1. In a scale, a platform, a mounting therefor, a beam, a variable fulcrum for said beam, means for changing the position of the fulcrum on said beam, and means for supporting the beam during the time of changing the fulcrum.

2. In a scale, a platform, a mounting therefor, a scale beam connected to the mounting, a rocking lever carrying spaced fulcrums for said beam, and means for actuating the rocking lever to determine which fulcrum moves into functional position.

3. In a scale, a platform, a mounting therefor, a scale beam, a connection between the mounting and the scale beam, a standard, interchangeable fulcrums for the scale beam carried by the standard, means for moving a selected fulcrum into functioning position, and means for locking the selected fulcrum rigid with respect to the beam.

4. In a scale, a platform, a mounting therefor, a scale beam, a plurality of bearing members carried by the beam, bearing seats, means for moving a selected seat into engaging position with respect to a particular bearing, and a lock for holding said selected seat in a predetermined position.

5. In a scale, a platform, a mounting therefor, a scale beam above the mounting, a support, a pivoted lever on the support, scale beam fulcrums carried by the lever, a manually operated device for actuating the lever to shift the fulcrums into engagement with the scale beam, and a lock for the manually operated device.

6. In a scale, a platform, a mounting therefor, variable fulcrum means, a scale beam supportable by the variable fulcrum means, means for actuating the variable fulcrum means, and means actuated by the first named means to move into beam supporting position when the variable fulcrum means are changing from one position to another.

7. In a scale, a platform, a mounting therefor, a scale beam connected to said mounting, a standard, a lever pivoted to said standard, a plurality of seats for said beam on said lever, a rotatable shaft connected to said lever, an actuating member mounted on said shaft for longitudinal movement only, a shaft, beam supporting fingers on said shaft, and means on the shaft and actuatable by the actuating member to move into beam supporting position.

In testimony whereof I affix my signature.

MATHEW SPINELLO.